United States Patent
Zhuang et al.

(10) Patent No.: US 11,617,246 B1
(45) Date of Patent: Mar. 28, 2023

(54) MULTI-CHANNEL CONSTANT CURRENT CIRCUIT AND LIGHTING DEVICE

(71) Applicant: SHENZHEN YITOA INTELLIGENT INDUSTRIAL CO., LTD, Shenzhen (CN)

(72) Inventors: Junhuang Zhuang, Shenzhen (CN); Shujie Wang, Shenzhen (CN); Zhihong Zheng, Shenzhen (CN)

(73) Assignee: SHENZHEN YITOA INTELLIGENT INDUSTRIAL CO., LTD, Shenzhen (CN)

( * ) Notice: Subject to any disclaimer, the term of this patent is extended or adjusted under 35 U.S.C. 154(b) by 0 days.

(21) Appl. No.: 17/578,727

(22) Filed: Jan. 19, 2022

(30) Foreign Application Priority Data

Dec. 10, 2021 (CN) .......................... 202123107086.2

(51) Int. Cl.
*H05B 45/34* (2020.01)
*H05B 45/345* (2020.01)
*H05B 45/48* (2020.01)
*H05B 45/395* (2020.01)

(52) U.S. Cl.
CPC ........... *H05B 45/345* (2020.01); *H05B 45/34* (2020.01); *H05B 45/395* (2020.01); *H05B 45/48* (2020.01)

(58) Field of Classification Search
CPC ........ H05B 45/10; H05B 45/30; H05B 45/34; H05B 45/345; H05B 45/395; H05B 45/48; H05B 47/10
See application file for complete search history.

(56) References Cited

U.S. PATENT DOCUMENTS

2022/0031904 A1\* 2/2022 Sahu .................. G01N 21/6428

\* cited by examiner

*Primary Examiner* — Jimmy T Vu
(74) *Attorney, Agent, or Firm* — Li & Cai Intellectual Property (USA) Office

(57) ABSTRACT

A multi-channel constant current circuit and a lighting device are provided. The multi-channel constant current circuit is used to drive UVC LED to emit light, and includes a constant voltage circuit and a first number of linear constant current diodes. The constant voltage circuit includes a power input terminal, a power output terminal and a voltage regulation sub-circuit. The power input terminal is connected to the power output terminal through the voltage regulation sub-circuit, each of the linear constant current diodes is connected to the power output terminal, the linear constant current diode is used to connect a second number of UVC LEDs and keeps a working current of each UVC LED, and the voltage regulation sub-circuit is used for a constant output voltage.

18 Claims, 3 Drawing Sheets

MULTI-CHANNEL CONSTANT CURRENT CIRCUIT AND LIGHTING DEVICE

FIELD OF THE DISCLOSURE

The present disclosure relates to a driving field, in particular, to a multi-channel constant current circuit and a lighting device.

BACKGROUND OF THE DISCLOSURE

LED (Light-Emitting Diode, light-emitting diode) is a common light-emitting device with the advantages of high luminous efficiency and long working life. The sensitivity of LEDs to current is higher than the sensitivity to voltage. Conventional LED arrays are usually connected in a multi-series and multi-parallel manner, so that multiple LEDs share a positive electrode and are connected to a constant current source drive circuit.

However, C-band ultraviolet light-emitting diode (UVC LED) is a light-emitting device with high forward voltage, which requires high voltage accuracy. Multi-parallel and multi-series UVC LEDs have the technical features of high voltage and low current, and are not suitable for circuit designs in which positive and negative poles are shared. In addition, when the forward voltage of the UVC LED is floating, the current distributed by the power supply to each string of UVC LEDs in parallel is not uniform. Constant current source driving circuit cannot output constant current due to frequent adjustment of output power, which results in flicking and failure of UVC LED.

SUMMARY OF THE DISCLOSURE

In view of the defects in the prior art, the purpose of the embodiments of the present disclosure is to provide a multi-channel constant current circuit and a lighting device to solve the problem that the UVC LED cannot be guaranteed to be in a constant voltage and constant current state.

The technical solution of the present disclosure is as follows.

In one aspect, the present disclosure provides a multi-channel constant current circuit used to drive UVC LED to emit light. The multi-channel constant current circuit includes a constant voltage circuit and a first number of linear constant current diodes. The constant voltage circuit includes a power input terminal, a power output terminal, and a voltage regulation sub-circuit. The power input terminal is connected to the power output terminal through the voltage regulation sub-circuit, each of the first number of linear constant current diodes is connected to the power output terminal, the linear constant current diode is used to connect a second number of UVC LEDs and keeps a working current of each UVC LED, and the voltage regulation sub-circuit is used for a constant output voltage.

In certain embodiments, the voltage regulation sub-circuit includes a voltage controller, an inductor, a switch tube, a first resistor, and a voltage feedback branch. One end of the inductor is connected to the power input terminal, another end of the inductor is correspondingly connected to the power output terminal and a first end of the switch tube, a second end of the switch tube is grounded through the first resistor, and the power output terminal is grounded through the voltage feedback branch. A power supply pin of the voltage controller is connected to the power input terminal, a drive signal pin of the voltage controller is connected to a control terminal of the switch tube, a feedback voltage pin of the voltage controller is connected to the voltage feedback branch, a detection pin of the voltage controller is grounded through the first resistor, a ground pin of the voltage controller is grounded, and a switch pin of the voltage controller is used to receive a switch signal of the voltage controller.

In certain embodiments, the constant voltage circuit further includes a Schottky diode. An anode of the Schottky diode is correspondingly connected to the another end of the inductor and the first end of the switch tube, a cathode of the Schottky diode is connected to the power output terminal, and the Schottky diode is used to prevent a backflow of current at the power output terminal.

In certain embodiments, the voltage feedback branch includes a second resistor and a third resistor, the cathode of the Schottky diode is grounded through the second resistor and the third resistor in sequence, and the feedback voltage pin of the voltage controller is connected to a node between the second resistor and the third resistor.

In certain embodiments, the switch tube is an NMOS tube, a drain of the NMOS tube is connected to the inductor, a source of the NMOS tube is grounded through the first resistor, and a gate of the NMOS tube is connected to the drive signal pin of the voltage controller.

In certain embodiments, the constant voltage circuit further includes a first filter circuit, and the power input terminal is grounded through the first filter circuit.

In certain embodiments, the first filter circuit includes a first electrolytic capacitor and a first ceramic capacitor. The power input terminal is grounded through the first electrolytic capacitor and the first ceramic capacitor respectively, the first electrolytic capacitor is used for a low-frequency filtering of the power input terminal, and the first ceramic capacitor is used for a high-frequency filtering at the power input terminal.

In certain embodiments, the constant voltage circuit further includes a second filter circuit, and the power output terminal is grounded through the second filter circuit.

In certain embodiments, the second filter circuit includes a second electrolytic capacitor and a second ceramic capacitor. The power output terminal is grounded correspondingly through the second electrolytic capacitor and the second ceramic capacitor, the second electrolytic capacitor is used for a low-frequency filtering of the power output terminal, the second electrolytic capacitor is used for storing electric charges, and the second ceramic capacitor is used for a high-frequency filtering at the power output terminal.

In another aspect, the present disclosure provides a lighting device, which including a UVC LED array and the multi-channel constant current circuit as described above. The UVC LED array includes a third number of UVC LED string groups, each of the third number of UVC LED string groups includes the second number of UVC LEDs connected in series, and a linear constant current diode is correspondingly grounded through one of the UVC LED string groups.

The present disclosure provided the following advantages.

In the multi-channel constant current circuit used to drive UVC LED to emit light provided by the present disclosure, the multi-channel constant current circuit includes the constant voltage circuit and the first number of linear constant current diodes, and each of the linear constant current diodes is connected to the power output terminal, which can ensure that each series-connected UVC LED is in a constant voltage and constant current state. In addition, each of the first number of linear constant current diodes is independent from each other. When the linear constant current diode is connected in series to the second number of UVC LEDs, the excessive forward voltage difference can be avoided and the voltage accuracy requirements when the UVC LEDs are connected in series can be reduced.

BRIEF DESCRIPTION OF THE DRAWINGS

In order to explain the technical solution of the present disclosure more clearly, the following will briefly introduce the drawings needed in the embodiments. It should be understood that the following drawings only show certain embodiments of the present disclosure, and therefore should not be regarded as a limitation of the scope of protection of the present disclosure. In each figure, similar components are numbered similarly.

Figure 1:
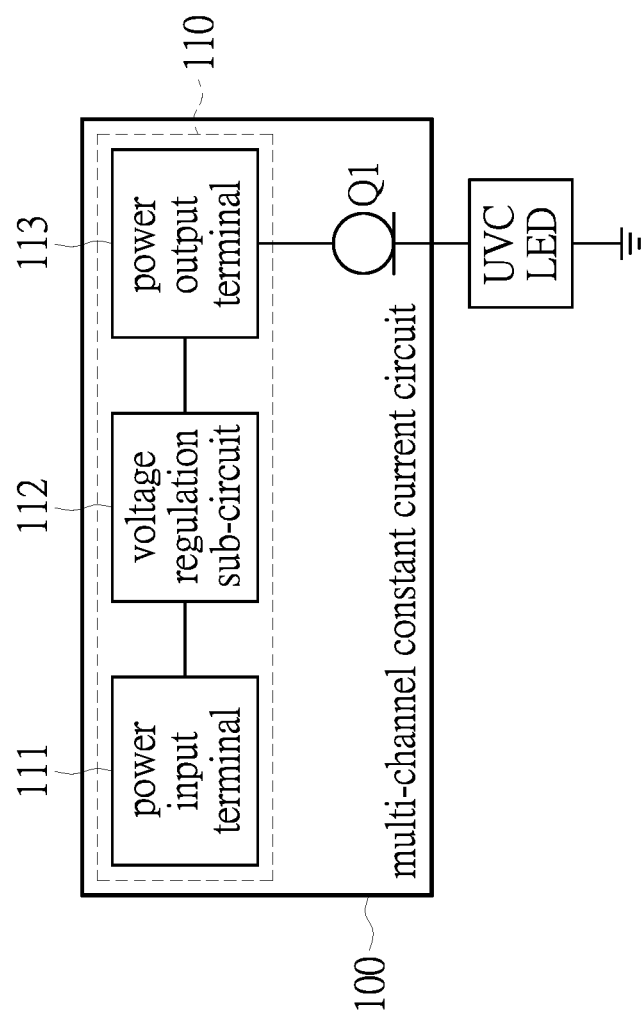
FIG. 1 is a schematic structural diagram of a multi-channel constant current circuit according to one embodiment of the present disclosure.

Reference numeral: 100—multiple-channel constant current circuit, 200—UVC LED array; 110—constant voltage circuit, 111—power input terminal, 112—voltage regulation sub-circuit, 113—power output terminal, 114—voltage feedback branch, 115—first filter circuit, 116—second filter circuit; 210—UVC LED string group; Q1—linear constant current diode, Q2—switch tube, Q3—Schottky diode, U—voltage controller, R1—first resistor, R2—second resistor, R3—third resistor, L—inductance, C1—first electrolytic capacitor, C2—first ceramic capacitor, C3—second electrolytic capacitor, C4—second ceramic capacitor; VCC—power supply pin, DRIVE—drive signal pin, VFB—feedback voltage pin, SENSE—detection pin, GND—ground pin, STDN—switch pin, a—node

DETAILED DESCRIPTION OF THE EXEMPLARY EMBODIMENTS

The following will clearly and completely describe the technical solutions in the embodiments of the present disclosure with reference to the accompanying drawings in the embodiments of the present disclosure. Obviously, the described embodiments are only a part of the embodiments of the present disclosure, not all the embodiments.

The components of the embodiments of the present disclosure generally described and shown in the drawings herein may be arranged and designed in various configurations. Therefore, the following detailed description of the embodiments of the present disclosure provided in the accompanying drawings is not intended to limit the scope of the claimed present disclosure, but merely represents selected embodiments of the present disclosure. Based on the embodiments of the present disclosure, all other embodiments obtained by those skilled in the art without creative work shall fall within the scope of protection of the present disclosure.

Hereinafter, the terms "including", "having" and their cognates that can be used in various embodiments of the present disclosure are only intended to represent specific features, numbers, steps, operations, elements, components, or combinations of the foregoing items, and should not be understood as first excluding the existence of one or more other features, numbers, steps, operations, elements, components or combinations of the foregoing items or adding one or more features, numbers, steps, operations, elements, components or the possibility of a combination of the foregoing.

In addition, the terms "first", "second", "third", etc. are only used for distinguishing description, and cannot be understood as indicating or implying relative importance.

Unless otherwise defined, all terms (including technical and scientific terms) used herein have the same meanings as commonly understood by those of ordinary skill in the art to which various embodiments of the present disclosure belong. The terms (such as those defined in commonly used dictionaries) will be interpreted as having the same meaning as the contextual meaning in the relevant technical field and will not be interpreted as having idealized or overly formal meanings, unless clearly defined in the various embodiments of the present disclosure.

Reference is made to FIG. 1, which shows a schematic structural diagram of a multi-channel constant current circuit according to one embodiment of the present disclosure. Exemplarily, a multi-channel constant current circuit 100 of the present disclosure is used to drive UVC LEDs to emit light. The multi-channel constant current circuit 100 includes a constant voltage circuit 110 and a first number of linear constant current diodes Q1. The constant voltage circuit 110 includes a power input terminal 111, a voltage regulation sub-circuit 112, and a power output terminal 113.

The power input terminal 111 is connected to the power output terminal 113 through the voltage regulation sub-circuit 112, and each of the first number of linear constant current diodes Q1 is connected to the power output terminal 113. The linear constant current diode Q1 is used to connect to a second number of UVC LEDs and keeps a working current of each UVC LED, and the voltage regulation sub-circuit 112 is used for a constant output voltage.

The linear constant current diode Q1 is a two-terminal junction field effect constant current device, which is used to output a constant current in a wide voltage range. Each of the first number of linear constant current diodes Q1 is connected in series to the second number of UVC LEDs to ground to form an independent UVC LED group. Each of the second number of UVC LEDs in the UVC LED group works at a constant current to ensure a stability of the UVC LED and avoid flickering and failure of the UVC LED.

The voltage regulation sub-circuit 112 is used to adjust a voltage of the constant voltage circuit 110, and the constant voltage circuit 110 provides a voltage not lower than a voltage of each UVC LED group. For example, if a UVC LED group includes 10 UVC LEDs, and the forward voltage of each UVC LED is 6V, the UVC LED group needs a forward voltage of 60V. The constant voltage circuit 110 needs to provide the voltage greater than 60V, where the forward voltage is the positive voltage applied from the anode to the cathode of the UVC LED.

It should be understood that the first number and the second number are values that are configured to be according to actual requirements, but are not limited herein. To facilitate the understanding of the technical solution of the present disclosure, in the present embodiment, the first number and the second number are both one.

Figure 2:
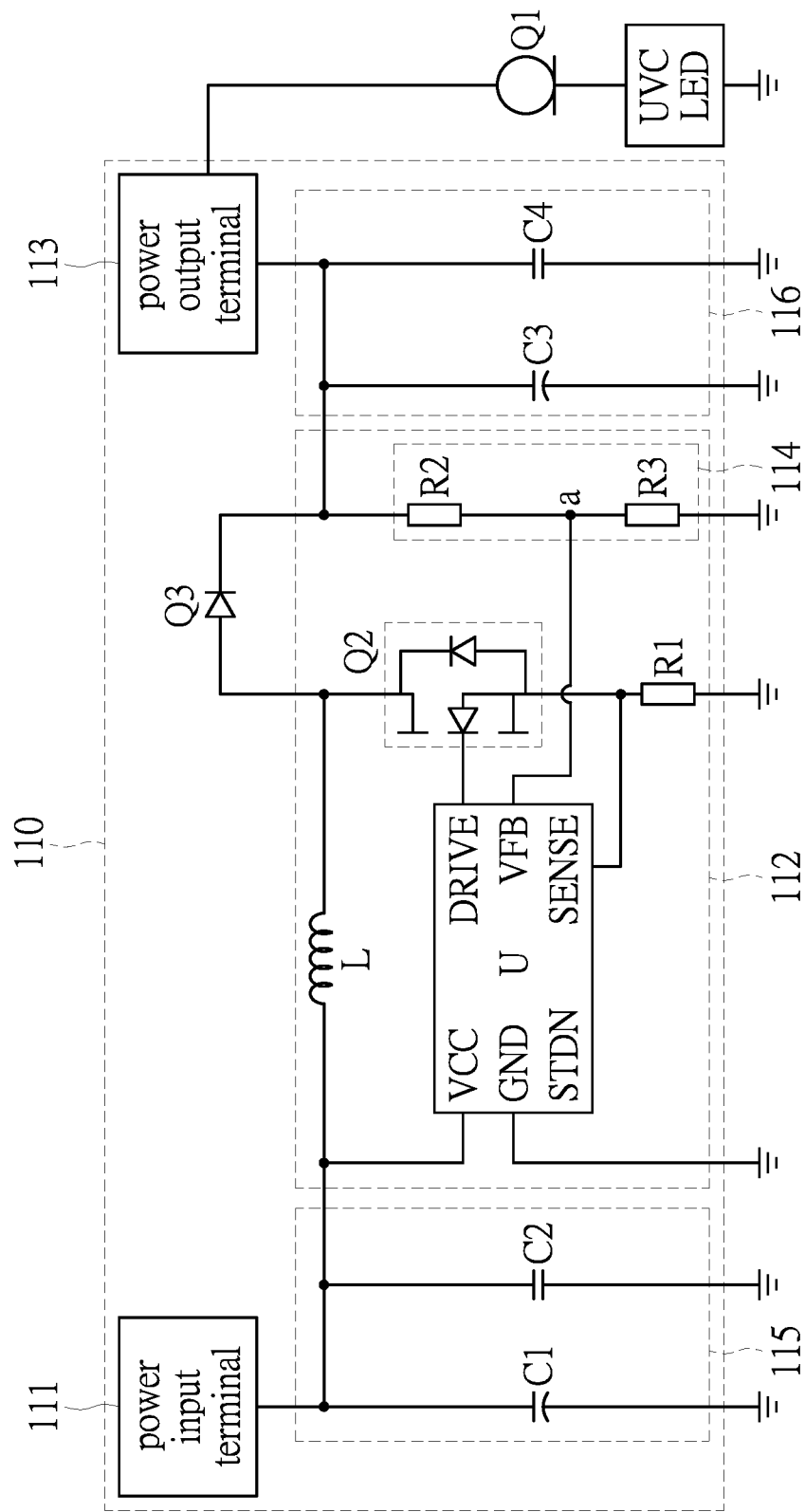
FIG. 2 is another schematic diagram of the structure of a multi-channel constant current circuit according to one embodiment of the present disclosure.

Reference is made to FIG. 2. FIG. 2 shows another schematic diagram of the structure of the multi-channel constant current circuit according to one embodiment of the present disclosure. The voltage regulation sub-circuit 112 includes a voltage controller U, an inductor L, a switch tube Q2, a first resistor R1, and a voltage feedback branch 114.

One end of the inductor L is connected to the power input terminal 111, and another end of the inductor L is correspondingly connected to the power output terminal 113 and a first end of the switch tube Q2. A second end of the switch tube Q2 is grounded through the first resistor R1, and the power output terminal 113 is grounded through the voltage feedback branch 114.

A power supply pin VCC of the voltage controller U is connected to the power input terminal 111, a drive signal pin DRIVE of the voltage controller U is connected to a control terminal of the switch tube Q2, a feedback voltage pin VFB of the voltage controller U is connected to the voltage feedback branch 114, a detection pin SENSE of the voltage controller U is grounded through the first resistor R1, and a ground pin GND of the voltage controller U is grounded. A switch pin STDN of the voltage controller U is used to receive a switch signal of the voltage controller U.

The feedback voltage pin VFB of the voltage controller U and the voltage feedback branch 114 adjust the voltage input to the power output terminal 113 so that the power output terminal 113 can provide a constant voltage.

When the switch tube Q2 is turned on, the current flows through the power output terminal 113 and the inductor L, driving the UVC LED and storing energy in the inductor L at the same time. The voltage controller U obtains the voltage of the detection pin SENSE, that is, the voltage of the first resistor R1. If the voltage of the first resistor R1 reaches a predetermined voltage threshold, the drive signal pin DRIVE of the voltage controller U outputs a drive signal to turn off the switch tube Q2. When the switch Q2 is turned off, the current of the inductor L cannot change suddenly, and the inductor L releases the stored energy. The voltage at the power input terminal 111 is boosted by the energy in the inductor L, so that the power output terminal 113 can provide the forward voltage required to drive the UVC LED.

The constant voltage circuit 110 also includes a Schottky diode Q3.

An anode of the Schottky diode Q3 is correspondingly connected to the another end of the inductor L and the first end of the switch tube Q2, and a cathode of the Schottky diode Q3 is connected to the power output terminal 113. The Schottky diode Q3 is used to prevent a backflow of the current at the power output terminal 113.

Current flows from a device with a high potential to a device with a low potential. After boosting the input to the power output terminal 113, the Schottky diode Q3 can effectively prevent the current at the power output terminal 113 from flowing back to the voltage controller U, causing damage to the pins of the voltage controller U.

The voltage feedback branch 114 includes a second resistor R2 and a third resistor R3. The cathode of the Schottky diode Q3 is grounded through the second resistor R2 and the third resistor R3 in sequence, and the feedback voltage pin VFB of the voltage controller U is connected to a node a arranged between the second resistor R2 and the third resistor R3.

It is assumed that a voltage value of the output voltage of the power output terminal 113 is Vout, a voltage value of the feedback voltage is Vfb, a resistance value of the second resistor R2 is r2, and a resistance value of the third resistor R3 is r3. The voltage that the power output terminal 113 needs to provide and the feedback voltage have the following relationship:

$$Vout=((r2/r3)+1)*Vfb.$$

By adjusting the values of the second resistor R2, the third resistor R3 and the feedback voltage, the power output terminal 113 can output a constant voltage, thereby ensuring that the UVC LED can be in a constant voltage and constant current state.

The switch tube Q2 is an NMOS tube, a drain of the NMOS tube is connected to the inductor L, a source of the NMOS tube is grounded through the first resistor R1, and a gate of the NMOS tube is connected to the drive signal pin DRIVE of the voltage controller U.

When the drive signal pin DRIVE of the voltage controller U inputs a high-level signal to the NMOS tube, the NMOS tube is configured to be in a conducting state. When the drive signal pin DRIVE of the voltage controller U inputs a low-level signal to the NMOS tube, the NMOS tube is configured to be in a disconnected state. The voltage controller U controls the on and off of the NMOS tube to boost the voltage at the power input terminal 111 according to the voltage of the first resistor R1, so that the power output terminal 113 can provide the forward voltage required to drive the UVC LED.

The constant voltage circuit 110 further includes a first filter circuit 115, and the power input terminal 111 is grounded through the first filter circuit 115.

The filter circuit can be regarded as an impedance adaptation network. The greater a impedance matching between the power supply and the UVC LED is, the more effective an attenuation of electromagnetic interference becomes. The first filter circuit 115 is used for filtering the power input terminal 111 to reduce the electromagnetic interference of the power input terminal 111.

The first filter circuit 115 includes a first electrolytic capacitor C1 and a first ceramic capacitor C2.

The power input terminal 111 is grounded correspondingly through the first electrolytic capacitor C1 and the first ceramic capacitor C2. The first electrolytic capacitor C1 is used for low-frequency filtering of the power input terminal 111. The capacitor C2 is used to filter the high frequency at the power input terminal 111.

The first electrolytic capacitor C1 filters out power signals lower than a predetermined frequency, and the first ceramic capacitor C2 filters out power signals higher than the predetermined frequency, so that the power input terminal 111 can input a power signal with a specific frequency.

The constant voltage circuit 110 further includes a second filter circuit 116, and the power output terminal 113 is grounded through the second filter circuit 116.

The second filter circuit 116 is used to filter the power output terminal 113 to reduce the electromagnetic interference of the power output terminal 113.

The second filter circuit 116 includes a second electrolytic capacitor C3 and a second ceramic capacitor C4.

The power output terminal 113 is grounded correspondingly through the second electrolytic capacitor C3 and the second ceramic capacitor C4. The second electrolytic capacitor C3 is used for low-frequency filtering of the power output terminal 113. The second electrolytic capacitor C3 is also used for storing electric charges, and the second ceramic capacitor C4 is used for high-frequency filtering of the power output terminal 113.

After boosting the power signal input from the power input terminal 111, the second electrolytic capacitor C3 filters out power signals lower than the predetermined frequency, and the second ceramic capacitor C4 filters out power signals higher than the predetermined frequency, so that the power output terminal 113 can input a power signal of a specific frequency. At the same time, the second electrolytic capacitor C3 is also used to store the electric charges. When the power signal input from the power input terminal 111 needs to be boosted, the second electrolytic capacitor C3 releases the stored electric charge to be replenished into the power signal, so as to provide the forward voltage required to drive the UVC LED.

The embodiments of the present disclosure also provides a lighting device, which includes a UVC LED array 200 and the multi-channel constant current circuit 100 as described in the present embodiment. The UVC LED array 200 includes a third number of UVC LED string groups 210, and each of the third number of UVC LED string groups 210 includes the second number of UVC LEDs connected in series, and the linear constant current diode Q1 is correspondingly grounded through one of the third number of UVC LED string groups 210.

Figure 3:
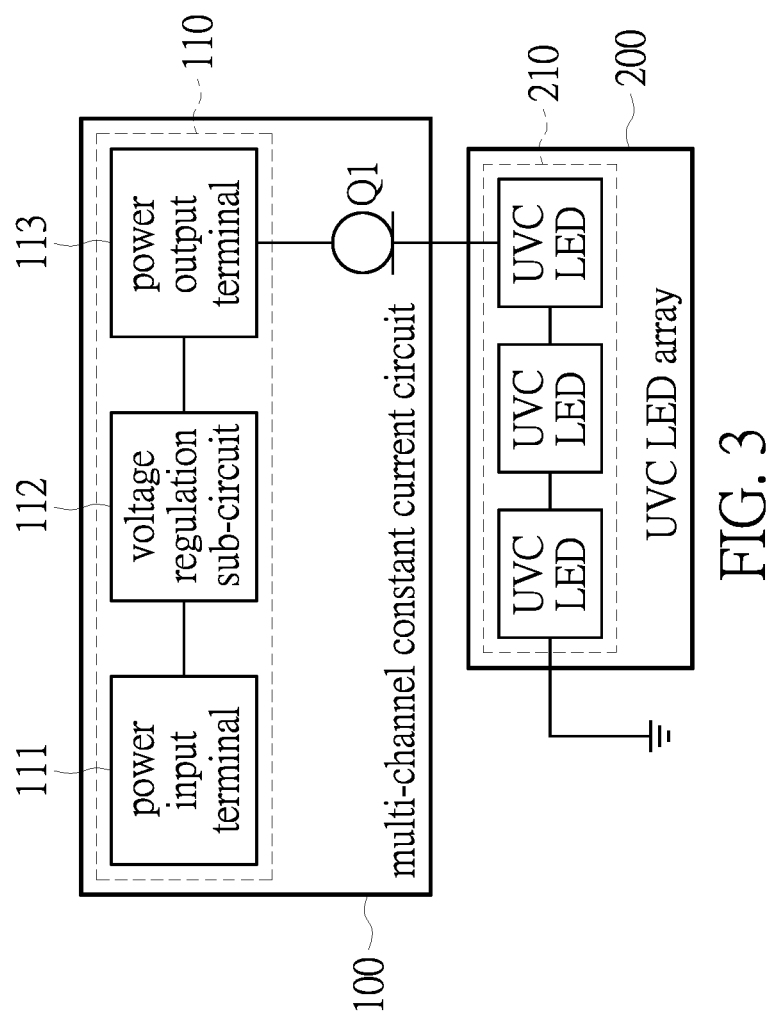
FIG. 3 is a schematic structural diagram of a lighting device according to one embodiment of the present disclosure.

Reference is made to FIG. 3, which shows a schematic structural diagram of a lighting device according to one embodiment of the present disclosure. To facilitate the understanding of the technical solution of the present disclosure, in the lighting device of this embodiment, the third number is one, and the second number is three.

The linear constant current diode Q1 ensures that each UVC LED is in a constant voltage and constant current state. At the same time, each of the first number of linear constant current diodes is independent from each other, and there is no excessive difference in a sequence voltage between any two UVC LEDs. When UVC LEDs are connected in series, there is no need to connect UVC LEDs with close forward voltages in series, which reduces the voltage accuracy requirements when UVC LEDs are connected in series.

In the several embodiments provided in the present disclosure, it should be understood that the disclosed device and method may also be implemented in other ways. The device embodiments described above are only schematic. For example, the flowcharts and structural diagrams in the drawings show the possible implementation architecture, functions, and operations of the devices, methods, and computer program products according to multiple embodiments of the present disclosure. In this regard, each block in the flowchart or block diagram may represent a module, program segment, or part of the code, and the module, program segment, or a part of the code contains one or more executable instructions for embodying the specified logic function. It should also be noted that, in alternative implementations, the functions marked in the block may also occur in a different order from the order marked in the drawings. For example, two consecutive blocks can actually be executed substantially in parallel, or they can sometimes be executed in the reverse order, depending on the functions involved. It should also be noted that each block in the structure diagram and/or flowchart, and the combination of the blocks in the structure diagram and/or flowchart, can be used as a dedicated hardware-based system that performs the specified functions or actions, or can be embodied by a combination of dedicated hardware and computer instructions.

In addition, the functional modules or units in the various embodiments of the present disclosure may be integrated together to form an independent part, or each module may exist alone, or two or more modules may be integrated to form an independent part.

If the function is implemented in the form of a software function module and sold or used as an independent product, it can be stored in a computer readable storage medium. Based on this understanding, the technical solution of the present disclosure essentially or the part that contributes to the existing technology or the part of the technical solution can be embodied in the form of a software product, and the computer software product is stored in a storage medium, which includes several instructions to make a computer device (which can be a smart phone, a personal computer, a server, or a network device, etc.) execute all or part of the steps of the method described in each embodiment of the present disclosure. The aforementioned storage media include: U disk, mobile hard disk, read-only memory (ROM, Read-Only Memory), random access memory (RAM, Random Access Memory), magnetic disks or optical disks and other media that can store program codes.

The above are only specific embodiments of the present disclosure, but the protection scope of the present disclosure is not limited thereto. Any person skilled in the art can easily think of changes or changes within the technical scope disclosed by the present disclosure. Replacement shall be covered within the scope of protection of the present disclosure.

What is claimed is:

1. A multi-channel constant current circuit used to drive UVC LED to emit light, the multi-channel constant current circuit comprising:
   a constant voltage circuit including a power input terminal, a power output terminal, and a voltage regulation sub-circuit; and
   a first number of linear constant current diodes;
   wherein the power input terminal is connected to the power output terminal through the voltage regulation sub-circuit, each of the first number of linear constant current diodes is connected to the power output terminal, the linear constant current diode is used to connect a second number of UVC LEDs and keeps a working current of each of the second number of UVC LEDs, and the voltage regulation sub-circuit is used for a constant output voltage.

2. The multi-channel constant current circuit according to claim 1, wherein the voltage regulation sub-circuit includes a voltage controller, an inductor, a switch tube, a first resistor, and a voltage feedback branch;
   wherein one end of the inductor is connected to the power input terminal, another end of the inductor is correspondingly connected to the power output terminal and a first end of the switch tube, a second end of the switch tube is grounded through the first resistor, and the power output terminal is grounded through the voltage feedback branch;
   wherein a power supply pin of the voltage controller is connected to the power input terminal, a drive signal pin of the voltage controller is connected to a control terminal of the switch tube, a feedback voltage pin of the voltage controller is connected to the voltage feedback branch, a detection pin of the voltage controller is grounded through the first resistor, a ground pin of the voltage controller is grounded, and a switch pin of the voltage controller is used to receive a switch signal of the voltage controller.

3. The multi-channel constant current circuit according to claim 2, wherein the constant voltage circuit further includes a Schottky diode;
   wherein an anode of the Schottky diode is correspondingly connected to the another end of the inductor and the first end of the switch tube, a cathode of the Schottky diode is connected to the power output terminal, and the Schottky diode is used to prevent a backflow of current at the power output terminal.

4. The multi-channel constant current circuit according to claim 3, wherein the voltage feedback branch includes a second resistor and a third resistor, the cathode of the Schottky diode is grounded through the second resistor and the third resistor in sequence, and the feedback voltage pin of the voltage controller is connected to a node between the second resistor and the third resistor.

5. The multi-channel constant current circuit according to claim 2, wherein the switch tube is an NMOS tube, a drain of the NMOS tube is connected to the inductor, a source of the NMOS tube is grounded through the first resistor, and a gate of the NMOS tube is connected to the drive signal pin of the voltage controller.

6. The multi-channel constant current circuit according to claim 1, wherein the constant voltage circuit further includes a first filter circuit, and the power input terminal is grounded through the first filter circuit.

7. The multi-channel constant current circuit according to claim 6, wherein the first filter circuit includes a first electrolytic capacitor and a first ceramic capacitor;
wherein the power input terminal is grounded through the first electrolytic capacitor and the first ceramic capacitor respectively, the first electrolytic capacitor is used for a low-frequency filtering of the power input terminal, and the first ceramic capacitor is used for a high-frequency filtering at the power input terminal.

8. The multi-channel constant current circuit according to claim 1, wherein the constant voltage circuit further includes a second filter circuit, and the power output terminal is grounded through the second filter circuit.

9. The multi-channel constant current circuit according to claim 8, wherein the second filter circuit includes a second electrolytic capacitor and a second ceramic capacitor;
wherein the power output terminal is grounded correspondingly through the second electrolytic capacitor and the second ceramic capacitor, the second electrolytic capacitor is used for a low-frequency filtering of the power output terminal, the second electrolytic capacitor is used for storing electrical charge, and the second ceramic capacitor is used for a high-frequency filtering at the power output terminal.

10. A lighting device, comprising:
a UVC LED array; and
the multi-channel constant current circuit according to claim 1;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

11. A lighting device, comprising:
a UVC LED array; and
the multi-channel constant current circuit according to claim 2;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

12. A lighting device, comprising:
a UVC LED array; and
the multi-channel constant current circuit according to claim 3;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

13. A lighting device, comprising:
a UVC LED array; and
the multi-channel constant current circuit according to claim 4;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

14. A lighting device, comprising:
a UVC LED array; and
the multi-channel constant current circuit according to claim 5;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

15. A lighting device, comprising:
a UVC LED array; and
the multi-channel constant current circuit according to claim 6;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

16. A lighting device, comprising:
a UVC LED array; and
the multi-channel constant current circuit according to claim 7;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

17. A lighting device, comprising:
a UVC LED array; and
the multi-channel constant current circuit according to claim 8;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

18. A lighting device, comprising:
a UVC LED array; and
the multi-channel constant current circuit according to claim 9;
wherein the UVC LED array includes a third number of UVC LED string groups, each of the third number of UVC LED string groups includes the second number of UVC LEDs connected in series, and a linear constant current diode is correspondingly grounded through one of the UVC LED string groups.

* * * * *